United States Patent
Tanaka

(10) Patent No.: US 6,357,225 B1
(45) Date of Patent: Mar. 19, 2002

(54) FAILURE DIAGNOSING DEVICE FOR EXHAUST GAS PURIFYING APPARATUS

(75) Inventor: Hiroshi Tanaka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/689,826

(22) Filed: Oct. 13, 2000

Related U.S. Application Data

(62) Division of application No. 09/152,173, filed on Sep. 11, 1998, now Pat. No. 6,158,212.

(30) Foreign Application Priority Data

Sep. 19, 1997 (JP) .............................. 9-255693

(51) Int. Cl.⁷ ................................................ F01N 3/00
(52) U.S. Cl. ............................. 60/277; 60/284; 60/287; 60/297
(58) Field of Search ................. 60/277, 285, 287, 60/288, 289, 284, 292, 297, 295

(56) References Cited

U.S. PATENT DOCUMENTS

| | | | |
|---|---|---|---|
| 5,090,200 A | 2/1992 | Arai | |
| 5,325,664 A | 7/1994 | Seki et al. | 60/276 |
| 5,349,816 A | 9/1994 | Sanbayashi et al. | 60/277 |
| 5,388,405 A * | 2/1995 | Fujishita et al. | 60/297 |
| 5,410,875 A | 5/1995 | Tanaka et al. | |
| 5,501,073 A | 3/1996 | Miyashita et al. | 60/284 |
| 5,517,820 A * | 5/1996 | Kuroda et al. | 60/274 |
| 5,524,433 A | 6/1996 | Adamczyk, Jr. et al. | |
| 5,537,321 A | 7/1996 | Yoshizaki et al. | 364/431.01 |
| 5,584,177 A | 12/1996 | Oketani et al. | 60/284 |
| 5,632,144 A | 5/1997 | Isobe | |
| 5,647,206 A | 7/1997 | Yamamoto et al. | |
| 5,729,220 A | 3/1998 | Terasaka et al. | 60/285 |
| 5,738,832 A | 4/1998 | Dogahara et al. | |
| 5,911,681 A | 6/1999 | Tanaka | |
| 5,956,947 A | 9/1999 | Tanaka | |
| 6,131,388 A * | 10/2000 | Sasaki et al. | 60/286 |
| 6,158,212 A * | 12/2000 | Tanaka | 60/277 |
| 6,182,445 B1 * | 2/2001 | Yamazaki et al. | 60/277 |

FOREIGN PATENT DOCUMENTS

| | | |
|---|---|---|
| EP | 0 588 315 | 3/1994 |
| JP | 6-093843 A | 4/1994 |
| JP | 6-101452 A | 4/1994 |
| JP | 7-259539 A | 10/1995 |
| JP | 8-093458 A | 4/1996 |

* cited by examiner

*Primary Examiner*—Thomas Denion
*Assistant Examiner*—Binh Tran
(74) *Attorney, Agent, or Firm*—Kenyon & Kenyon

(57) ABSTRACT

A failure judging device of the present invention is a device for diagnosing a failure of an exhaust purifying apparatus having a purifying catalyst for purifying an exhaust gas discharged from an internal combustion engine, and an adsorbing member for adsorbing an unburned gas component in the exhaust gas. The failure judging device judges a failure on the basis of temperatures of the adsorbing member and the purifying catalyst when oxidating reaction of the unburned gas component occurs in the adsorbing member or the purifying catalyst, i.e., a change in temperature of the adsorbing member or the purifying catalyst distinctly appears.

1 Claim, 11 Drawing Sheets

FAILURE DIAGNOSING DEVICE FOR EXHAUST GAS PURIFYING APPARATUS

This application is a division of application Ser. No. 09/152,173 filed Sep. 11, 1998 now U.S. Pat. No. 6,158,212.

BACKGROUND OF THE INVENTION

The present invention relates to a technology of diagnosing a failure of an exhaust purifying apparatus for purifying an exhaust gas discharged from an internal combustion engine.

An exhaust system of an internal combustion engine mounted in an automobile etc is provided with a catalyst device which retains a precious metal such as platinum, palladium etc serving as a catalyst for the purpose of purifying harmful gas components such as, e.g., carbon monoxide (CO), nitrogen oxide (Nox) or hydro carbon (HC) etc in an exhaust gas.

The catalyst device oxidates HC and CO in the exhaust gas into H2O and CO2 by making HC and CO react to oxygen O2, and simultaneously reduces Nox in the exhaust gas into H2O, CO2 and N2 by making Nox react to HC and CO in the exhaust gas.

Incidentally, a starting property is enhanced by setting an air fuel ratio of the engine lower than a theoretical air fuel ratio (a rich atmosphere) when starting the internal combustion engine, and hence a comparatively large amount of unburned gas component such as unburned hydro carbon (HC) is discharged. In particular, when the internal combustion engine is cold-started, a temperature of the internal combustion engine is low, and burning of a mixed gas becomes unstable. Hence, a large quantity of unburned gas component is to be discharged. The catalyst device described above is activated at a temperature above a predetermined temperature and is therefore brought into an non-activated state when lower than the predetermined temperature as in the case of the internal combustion engine being cold-started, with the result that the enormous amount of unburned gas component contained in the exhaust gas can not all purified. What is known as an apparatus for obviating the problem described above is an exhaust purifying apparatus constructed such that an adsorbing material for adsorbing the unburned gas component in the exhaust gas when lower than the predetermined temperature and desorbing the unburned gas component adsorbed thereto when over the predetermined temperature, is provided in an exhaust system disposed upstream of the catalyst device.

The exhaust purifying apparatus described above is intended to purify through the catalyst device the unburned gas component desorbed from the adsorbing material and the unburned gas component in the exhaust gas after the catalyst device has been activated while making the adsorbing material adsorb the unburned gas component in the exhaust gas when the catalyst device is in the non-activated state.

According to the above-described exhaust purifying apparatus, if an adsorbing performance of the adsorbing material declines due to a failure and deterioration etc, the unburned gas component contained in the exhaust gas can not be adsorbed to the adsorbing material but may be released into the atmospheric air. It is therefore of much importance to detect the failure and deterioration of the adsorbing material at a high accuracy and prevent the gas emission from worsening due to the failure and deterioration of the adsorbing material.

In response to such a request, there is proposed a known exhaust purifying apparatus disclosed in Japanese Patent Application Publication No. 8-93458. This exhaust purifying apparatus is constructed to judge the failure of the absorbing material on the basis of a temperature rising velocity in an adsorbing process of making the adsorbing material adsorb the unburned gas component, or a temperature rising velocity of the adsorbing material in a desorbing process of desorbing the unburned gas component desorbed to the adsorbing material.

An adsorption heat is evolved when the unburned gas component is adsorbed to the adsorbing material, and the temperature of the adsorbing material is increased by this adsorption heat. If the unburned gas component is adsorbed to an adsorbing material composed of porous activated carbon etc, however, interaction between the unburned gas component and the adsorbing material is weak, resulting in a physical adsorption in which no special chemical binding occurs. Hence, there must be a minute quantity of occurrence of the adsorption heat.

Therefore, according to the exhaust purifying apparatus, it is difficult to discern a change in temperature of the adsorbing material, which might cause a misguided diagnosis. Then, if the absorbing material is mis-diagnosed to be normal in spite of the adsorbing material having fallen into a failure, the gas emission worsens. Then, a temperature sensor exhibiting a high accuracy is required for preventing the mis-diagnosis described above.

SUMMARY OF THE INVENTION

It is a primary object of the present invention, which was contrived to overcome the problems given above, to provide a technology capable of precisely detecting a failure and deterioration etc of an adsorbing material without using a high-accuracy temperature sensor as well as preventing a gas emission from worsening.

To accomplish this object, the present invention adopts a construction which follows.

According to one aspect of the invention, a failure judging device for an exhaust purifying apparatus comprises a purifying catalyst provided on an exhaust passageway in an internal combustion engine, an adsorbing member, provided in series to the purifying catalyst, for adsorbing an unburned gas component in an exhaust gas, a temperature detecting element for detecting a temperature of the purifying catalyst or the adsorbing member, and a failure judging unit for judging a failure of the adsorbing member on the basis of the temperature detected by the temperature detecting element on the condition that the exhaust gas in an oxygen excessive state when the exhaust gas passes through the adsorbing member.

The failure judging unit makes a failure judgement about the adsorbing member on condition that the exhaust gas flowing to the adsorbing member is in the oxygen excessive state.

According to the thus constructed failure diagnosing device, when making the adsorbing member transmit the exhaust gas so as to adsorb the unburned gas component in the exhaust gas or making the adsorbing member transmit the exhaust gas so as to adsorb from the adsorbing member the unburned gas component adsorbed to the adsorbing member, and when the exhaust gas is in the oxygen excessive state, the failure judging unit judges a failure of the adsorbing member on the basis of the temperature detected by the temperature detecting element.

On this occasion, the adsorbing member of the purifying catalyst comes into an oxygen excessive atmosphere, and therefore reaction of the adsorbing member of the purifying catalyst to the unburned gas component is activated, as a result of which there appears a distinct change in temperature with respect to the adsorbing member of the purifying catalyst.

For example, if the adsorbing member is normal and is in such a state that the adsorbing member is capable of adsorbing and desorbing a predetermined quantity of unburned gas component, the unburned gas component is exposed to the exhaust gas in the oxygen excessive atmosphere when in the adsorbing or desorbing process, and hence there increases an adsorption heat quantity due to the stabilized adsorption or increases a burning temperature due to activated burning of the unburned gas component desorbed therefrom. Whereas if the adsorbing member is abnormal and is in such a state that the adsorbing member is incapable of adsorbing and desorbing the predetermined quantity of unburned gas component, there might be caused decreases both in the adsorption heat quantity and in the burning temperature.

As described above, a temperature difference in the adsorbing member and in the purifying catalyst becomes distinct between at the normal time of the adsorbing member and at the abnormal time thereof, and it is possible to detect the temperature difference between at the normal time and at the abnormal time without using a high-accuracy temperature sensor.

Therefore, according to the present invention, the failure judgement is made based on a temperature when the oxidating reaction to the unburned gas occurs in the adsorbing member or the purifying catalyst, i.e., when there appears the distinct change in temperature of the adsorbing member or the purifying catalyst. It is therefore feasible to make a precise judgement without using even the high-accuracy temperature sensor.

Note that there may be exemplified, as the oxygen excessive state mentioned above, a state where a fuel supply to the internal combustion engine is stopped, or a state where an air fuel ratio of a mixed gas burned in the internal combustion engine is in the oxygen excessive atmosphere.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DETAILED DESCRIPTION

Figure 1:
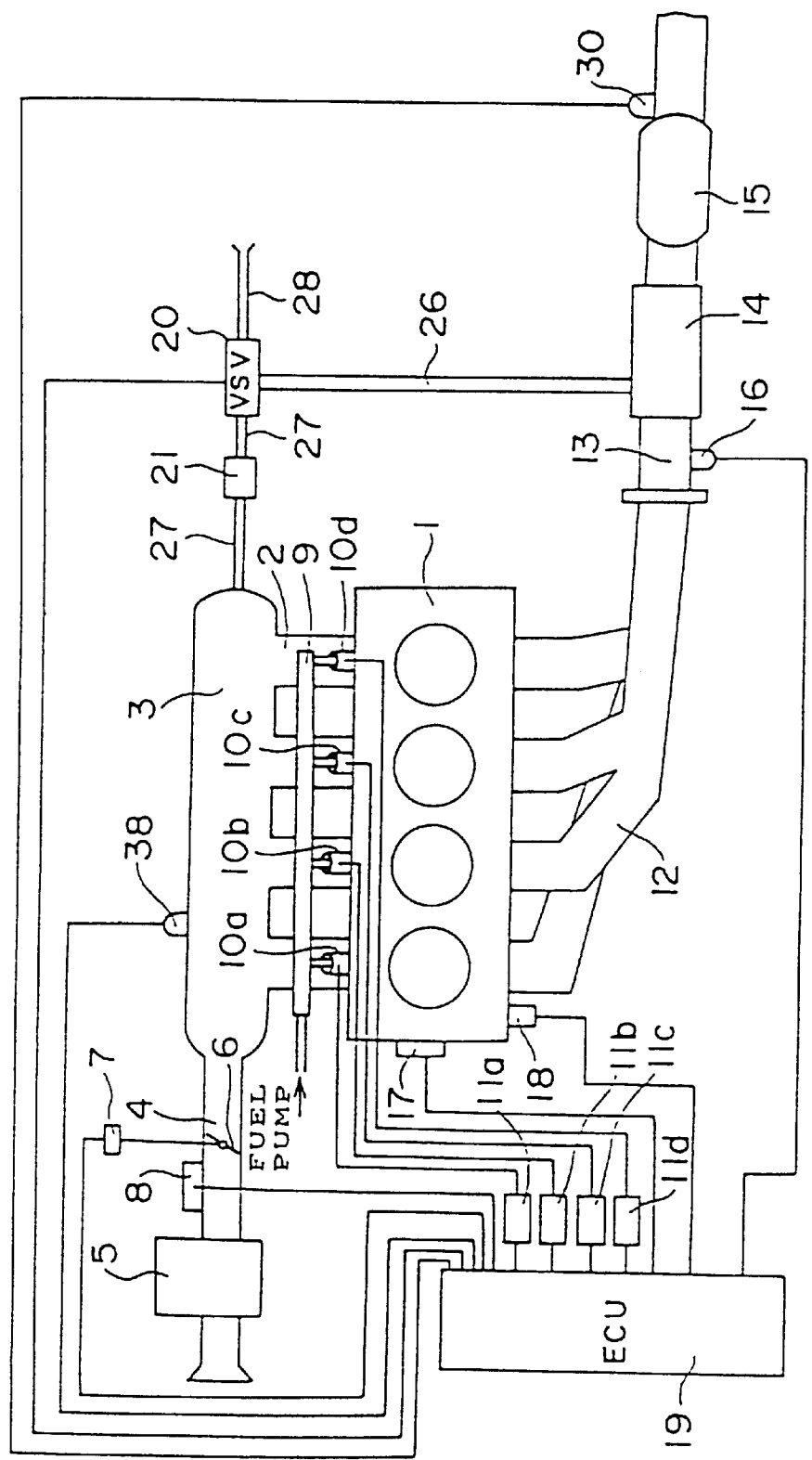
FIG. 1 is a diagram schematically showing constructions of an internal combustion engine and a suction/discharging system, to which the present invention is applied.

An embodiment of a failure diagnosing device according to the present invention will hereinafter be described with reference to the accompanying drawings. FIG. 1 is a diagram schematically illustrating constructions of an internal combustion engine and a suction/exhaust system thereof, to which an exhaust purifying device of the present invention is applied.

The internal combustion engine shown in FIG. 1 is a 4-cycle 4-cylinder internal combustion engine 1. A suction branch pipe 2 and an exhaust branch pipe 12 are connected to this internal combustion engine 1. The suction branch pipe is connected to a surge tank 3 which is connected via a suction pipe 4 to an air cleaner box 5.

The suction pipe is provided with a throttle valve 6 for controlling a flow rate of suction air flowing within the suction pipe 4, interlocking with an unillustrated accelerator pedal. The throttle valve 6 is fitted with an idle switch 7 for outputting an ON-signal when the throttle valve 6 is in a full-open state and outputting an OFF-signal when in states other than the full-open state.

The suction pipe 4 disposed upstream of the throttle valve 6 is fitted with an air-flow meter 8 for outputting an electric signal corresponding to a mass of the suction air flowing inside the suction pipe 4.

The surge tank 3 is attached with a vacuum sensor 38 for outputting an electric signal corresponding to a pressure within the surge tank 3.

Fuel injection valves 10a, 10b, 10c, 10d (which are hereinafter generically designated by 10) are secured to respective sub-branch pipes of the suction branch pipe 2. These fuel injection valves 10 are connected to a fuel distribution pipe 9. The fuel distribution pipe 9 serves to distribute, to the respective fuel injection valves 10, the fuel supplied by pressure from an unillustrated fuel pump.

The fuel injection valves 10 are connected to driving circuits 11a, 11b, 11c, 11d (hereinafter generically designated by 11). The fuel injection valves 10 open when given application of driving currents from those driving circuits 11, and inject the fuel supplied from the fuel distribution pipe 9 into the suction branch pipe 2.

On the other hand, the exhaust branch pipe 12 is connected to an exhaust pipe 13 which is connected downstream to an unillustrated silencer. Provided midways of the exhaust pipe 13 are an adsorption cylinder 14 and an exhaust purifying catalyst 15, positioned downstream of this adsorption cylinder 14, for purifying components such as Nox, HC and CO in the exhaust gas flowing within the exhaust pipe 13.

Figure 2:
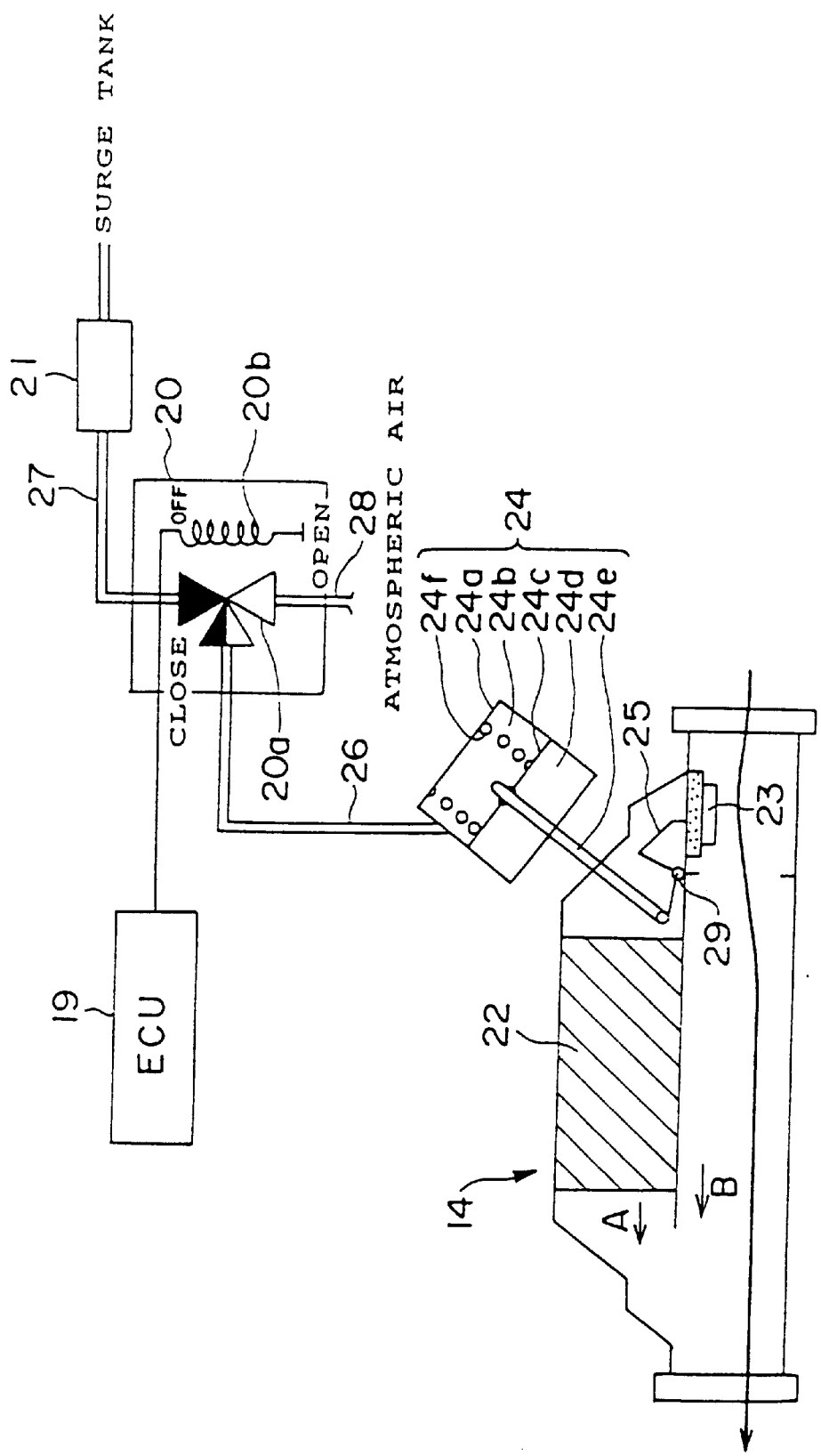
FIG. 2 is a sectional view showing a configuration of an adsorption cylinder 14.

The adsorption cylinder 14 is, as illustrated in FIG. 2, sectioned inside into two flow paths A and B. The flow path A is provided with an adsorbing material 22 of, e.g., a zeolite group, which serves as an adsorbing element according to the present invention. The adsorbing material 22 adsorbs unburned HC in the exhaust gas when less than a predetermined temperature, and desorbs the unburned HC adsorbed when above the predetermined temperature.

An inlet of the adsorption cylinder 4 is fitted with a bypass valve 23 selectively opening and closing the flow paths A and B. The bypass valve 23 is connected to a lever 25 turning about a fulcrum 29. When an adsorbing-material-side edge of the lever 25 is pushed down, a bypass-valve-side edge thereof is pushed up corresponding thereto, as a result of which the flow path B is made conductive and simultaneously the flow path A is shut off.

By contrast, when the adsorbing-material-side edge of the lever 25 is pulled up, the bypass-valve-side edge thereof is pushed down corresponding thereto, as a result of which the bypass valve 23 makes the flow path A conductive and simultaneously shuts off the flow path B.

An actuator 24 for actuating the lever 25 is disposed outwardly of the adsorption cylinder 4. The actuator 24 has a diaphragm 24c a peripheral edge of which is fixed to a side wall inside a box body 24a. The diaphragm 24c serves to section an interior of the box body 24a into two spatial portions 24b, 24d. The actuator 24 also includes a shaft 24e penetrating in an axial direction this diaphragm 24c and so held as to be movable back and forth.

The shaft 24e is fixed to the diaphragm 24c and moves back and forth interlocking with operations of the diaphragm 24c. A front edge of the shaft 24e protrudes outwardly of the box body 24a, and its edge portion thereof is connected to the adsorbing-material-side edge of the lever 25.

Of the two spatial portions 24b, 24d in the box body 24a, a spring 24f for biasing the diaphragm 23 so that shaft 24 advances, is provided within the spatial portion 24b positioned on the side of a proximal end of the shaft 24c.

The spatial portion 24b is connected via a negative pressure passageway 26 to a three-way switch valve (VSV) 20. A suction negative pressure passageway 27 and an atmospheric pressure passageway 28 in addition to the negative pressure passageway 26, are connected to this VSV 20.

The suction negative pressure passageway 27 is connected to the suction pipe 4 disposed downstream of the throttle valve 6, and suction pipe negative pressure produced in the suction pipe 4 is led to the VSV 20. A relief valve 21 is provided midways of the suction negative pressure passageway 27. The relief valve 21 regulates, to a fixed pressure, the suction pipe negative pressure led into the suction negative pressure passageway 27 from the suction pipe 4. On the other hand, the atmospheric pressure passageway 28 has an aperture edge open to the atmospheric air and leads the atmospheric pressure to the VSV 20.

The VSV 20 includes a valve member 20a for switching the conduction (which implies closing of the atmospheric pressure passageway 28) between the negative pressure passageway 26 and the suction negative pressure passageway 27, and the conduction (which implies closing of the suction negative pressure passageway 27) between the negative pressure passageway 26 and the atmospheric pressure passageway 28, as well as including a solenoid 20b for driving the valve member 20a.

Upon application of a driving pulse signal having a duty ratio corresponding to a ratio of a conduction time between the negative pressure passageway 26 and the suction negative pressure passageway 27 to a conduction time between the negative pressure passageway 26 and the atmospheric pressure passageway 28, the solenoid 20b drives the valve member 20a in accordance with this driving pulse signal, and switches the conduction between the negative pressure passageway 26 and the suction negative pressure passageway 27 and the conduction between the negative pressure passageway 26 and the atmospheric pressure passageway 28.

Incidentally it is assumed that the solenoid 20b, when the driving pulse signal having a duty ratio of 100% is applied thereto, drives the valve member 20a to keep the conductive state (the closed state of the atmospheric pressure passageway 28) between the negative pressure passageway 26 and the suction negative pressure passageway 27 and, when the driving pulse signal having a duty ratio of 0% is applied thereto, drives the valve member 20a to keep the conductive state (the closed state of the suction negative pressure passageway 27) between the negative pressure passageway 26 and the atmospheric pressure passageway 28.

Figure 3:
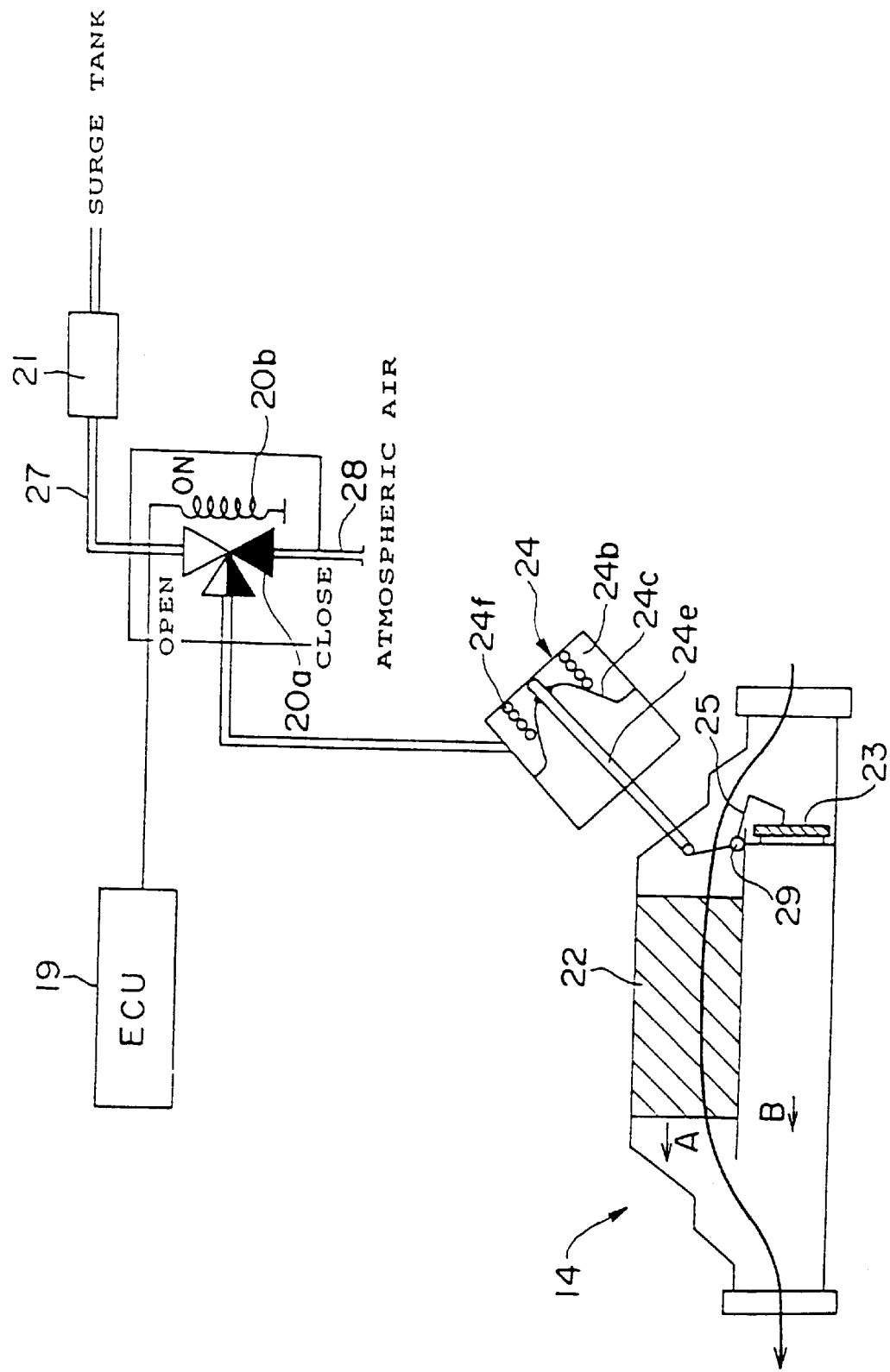
FIG. 3 is an explanatory diagram showing an operation of the adsorption cylinder 14.

When the driving pulse signal having the duty ratio of 100% is applied to the VSV 20, and when there is conducted between the suction negative pressure passageway 27 and the negative pressure passageway 26, the suction pipe negative pressure produced within the surge tank 3 is led via the relief valve 21 and the VSV 20 to the spatial portion 24b of the actuator 24. At this time, if the negative pressure in the spatial portion 24b is larger than the biasing force of the spring 24f, the diaphragm 24c is, as illustrated in FIG. 3, attracted toward the spatial portion 24b. With this attraction, the shaft 24e moves back to pull up the adsorbing-material-side edge of the lever 25. As a result, the bypass-valve-side edge of the lever 25 is pushed down, and the bypass valve 23 opens the flow path A in the adsorption cylinder 14 and closes the flow path B.

When the driving pulse signal having the duty ratio of 0% is applied to the VSV 20, and when there is conducted between the atmospheric pressure passageway 28 and the negative pressure passageway 26, the atmospheric air led in from the aperture edge of the atmospheric pressure passageway 28 is the led into the spatial portion 24b of the actuator 24 via the VSV 20. At this time, the negative pressure in the spatial portion 24b becomes smaller than the biasing force of the spring 24f, and hence the diaphragm 24c is, as illustrated in FIG. 2, biased toward the spatial portion 24d by the spring 24f. With this basing, the shaft 24e advances to push down the adsorbing-material-side edge of the lever 25. As a result, the bypass-valve-side edge of the lever 25 is pulled up, and the bypass valve 23 closes the flow path A in the adsorption cylinder 14 and opens the flow path B.

Herein, referring back to FIG. 1, the exhaust pipe 13 dispose upstream of the adsorbing material 14 is fitted with an air fuel ratio sensor 16 for outputting a voltage corresponding to an air fuel ratio of the exhaust gas flowing within the exhaust pipe 13. An outlet of the exhaust purifying catalyst 15 is attached with an exhaust temperature sensor 30 for outputting an electric signal corresponding to a temperature of the exhaust gas passing through the exhaust purifying catalyst 15.

The exhaust temperature sensor 30 is one example of a temperature detecting device according to the present invention, and an exhaust gas temperature detected by this exhaust temperature sensor 30 is used as a substitute value for a temperature of the exhaust purifying catalyst 15.

Note that a method of detecting the temperatures of the adsorbing material 22 and of the exhaust purifying catalyst 15 may involve a method of directly detecting the temperatures of the adsorbing material 22 and of the exhaust purifying catalyst 15 themselves, and a method of indirectly estimating temperatures from operating states (e.g., a suction air quantity, a load, the number of rotations, and an air fuel ratio etc) of the internal combustion engine.

Next, the internal combustion engine 1 is fitted with a crank position sensor 17 for outputting an electric signal each time a unillustrated crank shaft rotates through a predetermined angle (e.g., 30 degrees), and a water temperature sensor 18 for outputting an electric signal corresponding to a temperature of cooling water.

The crank position sensor 17, the water temperature sensor 18, the idle switch 7, the air flow meter 8, the vacuum sensor 38, the air fuel ratio sensor 16 and the exhaust temperature sensor 30, are respectively connected via electric wires to an electronic control unit (ECU) 19 for controlling the engine, and output signals of the sensors are inputted to the ECU 19.

The ECU 19 judges an operating state of the internal combustion engine 1, wherein the output signals from the above-mentioned sensors are used as parameters. The ECU 19 then executes a variety of control processes such as fuel injection control and flow path switching control of the adsorption cylinder 14 and abnormality judging control of the adsorbing material 22 which may be conceived as a gist of the present invention.

Figure 4:
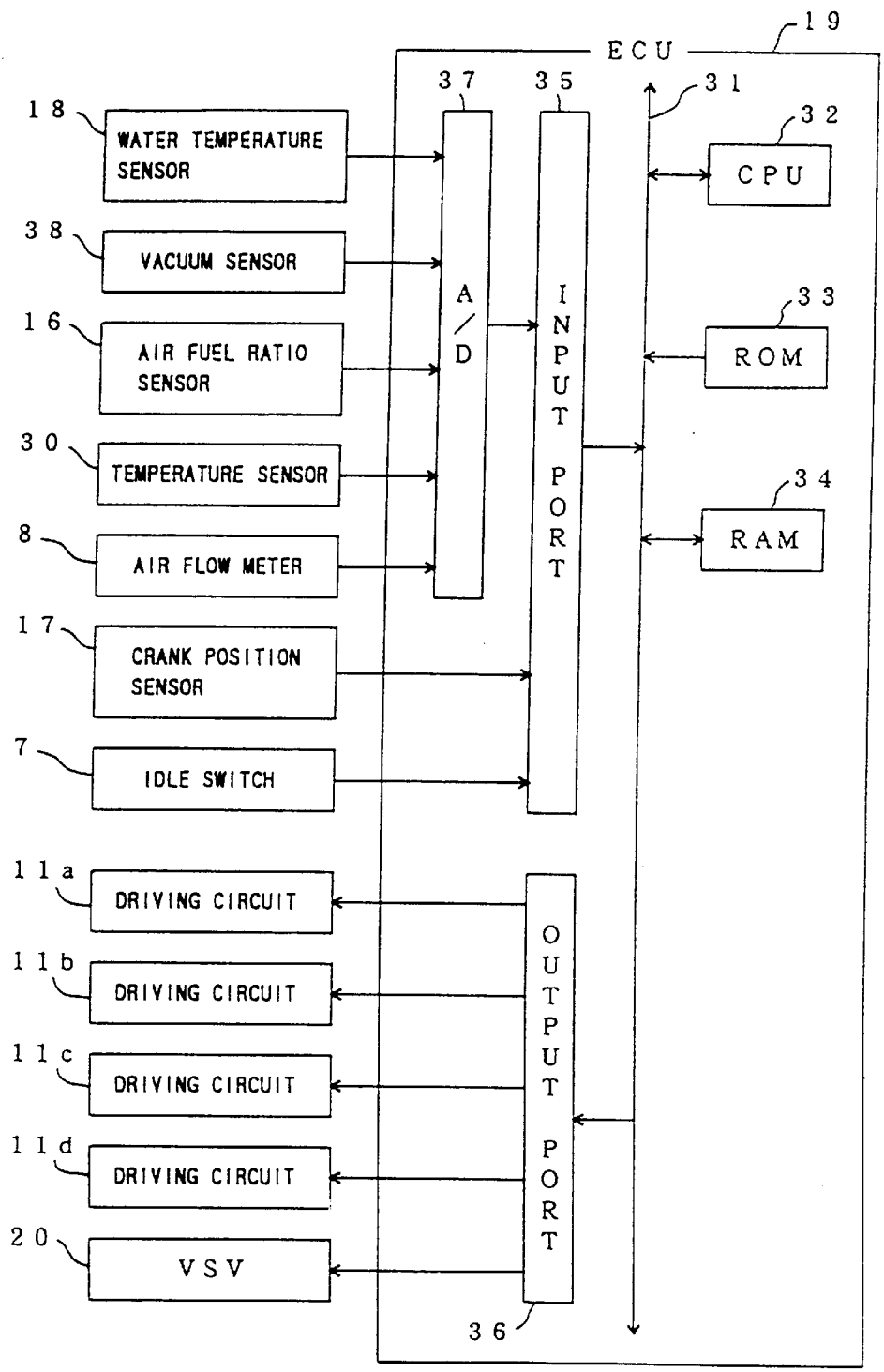
FIG. 4 is a block diagram illustrating an internal configuration of an ECU 19.

The ECU 19, as shown in FIG. 4, includes a CPU 32, a ROM 33, a RAM 34, an input port 35 and an output port 36, which are connected to each other via a bidirectional bus 31, and also includes an A/D converter (A/D) 37 connected to the input port 35.

The input port 35 inputs signals from the idle switch 7 and the crank position sensor 17, and transmits these signals to the CPU 32 and the RAM 34. Further, the input port 35 inputs signals from the air flow meter 8, the air fuel ratio sensor 16, the water temperature sensor 18, the exhaust temperature sensor 30 and the vacuum sensor 38 via the A/D converter 37, and transmits these signals to the CPU 32 or the RAM 34.

The output port 36 outputs a control signal from the CPU 32 to the driving circuit 11 or the VSV 20.

The ROM 33 is stored with application programs such as a fuel injection quantity control routine for determining a fuel injection quantity of each fuel injection valve 7, a fuel injection timing control routine for determining a fuel injection timing of each fuel injection valve 7, a bypass valve control routine for controlling the bypass valve 23 or an adsorbing material abnormality judging routine for judging an abnormal state of the adsorbing material 22, and with a variety of control maps.

The control maps may be, for instance, a fuel injection quantity control map for indicating a relationship between an operating state of the internal combustion engine 1 and a fuel injection quantity, a fuel injection timing control map for indicating a relationship between an operating state of the internal combustion engine 1 and a fuel injection timing, an activation judgement control map for indicating a relationship between a temperature of the cooling water when starting the internal combustion engine 1 and a time (hereinafter referred to as a catalyst activating time) required till the purifying catalyst 15 is activated since the engine 1 has been started, and a VSV control map for indicating a relationship between an operating state of the internal combustion engine 1 and a duty ratio for the VSV control.

The ROM 33 is stored with a first desorption judgement control map and a second desorption judgement control map in addition to the control maps described above.

The first desorption judgement control map shows a relationship between a temperature of the cooling water when starting the internal combustion engine and an integrating suction air quantity for a first judgement. What is herein connoted as the integrating suction air quantity for the first judgement is a quantity of air that might be sucked by the internal combustion engine 1 until a temperature of the adsorbing material 22 increases up to a predetermined temperature (at which the unburned gas component adsorbed by the adsorbing material 22 starts being desorbed) since the internal combustion engine 1 has started.

The second desorption judgement control map shows a relationship between the temperature of the cooling water when starting the internal combustion engine and an integrating suction air quantity for a second judgement. The integrating suction air quantity for the second judgement is a quantity of air that might be sucked by the internal combustion engine 1 until the temperature of the adsorbing material 22 increases up to a predetermined temperature (at which the desorption of the unburned gas component adsorbed by the adsorbing material 22 comes to an end) since the internal combustion engine 1 has started.

Next, the RAM 34 is stored with the output signals from the sensors and a result of the calculation of the CPU 32. The result of the calculation is, for example the number of rotations of the engine which is calculated from the output signal of the crank position sensor 17. Then, the output signal of each sensor and the result of the calculation of the CPU 32 are rewritten with latest data each time the crank position sensor 17 outputs the signal.

Set in the RAM 34 are areas for storing an activation judgement flag (active time: 1, and non-active time: 0) for judging whether the exhaust purifying catalyst 15 is activated or not, a deceleration fuel cut judgement flag (deceleration fuel cut executing time: 1, and deceleration fuel cut non-executing time: 0) for judging whether or not a vehicle mounted with the internal combustion engine 1 is in a decelerated state and in a state where a fuel supply to the internal combustion engine 1 is stopped, i.e., in a so-called deceleration fuel cut executing state, a desorption completion flag (desorption completion time: 1, and desorption non-completion time: 0) for judging whether or not a desorbing process from the adsorbing material 22 is completed, and a deterioration judgement end flag (deterioration judgement end time: 1, and deterioration judgement unended time: 1) for judging whether or not a deterioration judgement of the adsorbing material 22 is ended.

The CPU 32 operates based on the application program stored in the ROM 33, then judges the operating state of the internal combustion engine 1 from the output signals of the sensors which are stored the RAM 34, and calculates the fuel injection quantity, the fuel injection timing and the VSV control duty ratio from the respective control maps as well as from the operating state. Then, the CPU 32 controls the driving circuit 11 and the VSV 20 in accordance with the thus calculated fuel injection quantity, fuel injection timing and VSV control duty ratio.

The CPU 32, on the occasion of controlling the bypass valve 23, inputs the output signal of the water temperature sensor 18 when starting the internal combustion engine 1, and calculates a catalyst activating time from the above output signal and the activation judgement control map in the ROM 33. The CPU 32 judges whether the catalyst activating time is 0 or not.

The CPU 32, when judging that the catalyst activating time is 0, infers that the exhaust purifying catalyst 15 be in the active state, and writes "1" to the activation judgement flag storage area of the RAM 34. The CPU 32 applies to the VSV 20 a driving pulse corresponding to a duty ratio 0%, makes conductive the flow path B in the adsorption cylinder 14, and closes the flow path A. At this time, the exhaust gas discharged from the internal combustion engine 1 flows into the exhaust purifying catalyst 15 via the flow path B within the adsorption cylinder 14, and the unburned gas component in the exhaust gas is purified by the exhaust purifying catalyst 15.

While on the other hand, when judging that the catalyst activating time is not 0, the CPU 32 infers that the exhaust purifying catalyst 15 be in the non-activated state, and writes "0" to the activation judgement flag storage area of the RAM 34. The CPU 32 writes the catalyst activating time to the predetermined area of the RM 34, and starts a timer for counting an operation time elapsed since the internal combustion engine 1 has started. Then, the CPU 32 has an access to the first and second desorption judgement control maps of the ROM 33, then calculates the first and second judgement integrating suction air quantities corresponding to the output signals of the water temperature sensor 18, and writes the calculated values to the predetermined areas of the RAM 34.

Further, the CPU 32 applies to the VSV 20 the driving pulse corresponding to the duty ratio 100%, then makes conductive the flow path A in the adsorption cylinder 14, and closes the flow path B. At this time, the exhaust gas discharged from the internal combustion engine 1 flows into the exhaust purifying catalyst 15 via the adsorbing material 22 within the adsorption cylinder 14, and the unburned gas component in the exhaust gas is adsorbed by the adsorption cylinder 14.

Thereafter, when a count time of the timer reaches the catalyst activation time, the CPU 32 rewrites the activation judgement flag of the RAM 34 from "0" to "1". Subsequently, the CPU 32 applies to the VSV 20 the driving pulse corresponding to the duty ratio 0%. At this time, the flow path B within the adsorption cylinder 14 is made conductive, whereas the flow path A is closed. The exhaust gas discharged from the internal combustion engine 1 flows into the exhaust purifying catalyst 15 via the flow path B within the adsorption cylinder 14. As a consequence of this, the unburned gas component in the exhaust gas is purified by the exhaust purifying catalyst 15.

Herein, the adsorption cylinder 14 increases in temperature because of directly receiving the heat of the exhaust gas for a duration of the conduction of the flow path A, and also increases in temperature due to a transmission of the heat of the exhaust gas flowing inside the flow path B through the constructive member of the adsorption cylinder 14 for a duration of the closing of the flow path A. Then, the CPU 32, when an integrated value of the suction air quantity since the engine has started comes to the first judgement integrating suction air quantity stored in the RAM 34, infers that the temperature of the adsorbing material 22 rises up to a temperature at which it starts desorbing the unburned gas component.

The CPU 32, when judging that the temperature of the adsorbing material 22 rises up to the temperature at which it starts desorbing the unburned gas component, applies to the VSV 20 the driving pulse corresponding to the duty ratio 100% in order to burn and purify the unburned gas component desorbed from the adsorbing material 22 by use of the exhaust purifying catalyst 15. At this time, the flow path A within the adsorption cylinder 14 is made conductive, whereas the flow path B is closed, with the result that the exhaust gas discharged from the internal combustion engine 1 flows into the exhaust purifying catalyst 15 via the adsorbing material 22 in the adsorption cylinder 14. As a result, the unburned gas component desorbed from the adsorbing material 22 flows into the exhaust purifying catalyst 15 together with the exhaust gas, and burned and purified by the exhaust purifying catalyst 15.

As described above, in the state where the flow path A is made conductive, the adsorbing material 22 rises in temperature because of directly receiving the heat of the exhaust gas. Then, the CPU 32, when the integrated value of the suction air quantity since the engine has started comes to the second judgement integrating suction air quantity stored in the RAM 34, infers that the temperature of the adsorbing material 22 rises up to a temperature at which the adsorption of the unburned gas component finishes.

The CPU 32, when judging that the temperature of the adsorbing material 22 rises up to the temperature at which the desorption of the unburned gas component is finished, applies to the VSV 20 the driving pulse corresponding to the duty ratio 0% after writing "1" to the desorption completion flag storage area of the RM 34. Then, the CPU 32 closes the flow path A within the adsorption cylinder 14 and permits the conduction of the flow path B.

Further, the CPU 32, in a so-called desorbing process of desorbing and purifying the unburned gas component adsorbed by the adsorbing material 22, makes a deterioration judgement about the adsorbing material 22 when an oxygen concentration in the exhaust gas flowing into the exhaust purifying catalyst 15. More specifically, the CPU 32, in the desorbing process, if the internal combustion engine 1 is in such an operating state as to enhance the oxygen concentration in the exhaust gas, inputs an output signal value of the exhaust temperature sensor 30 when starting the desorbing process, and this output signal value is stored as a first temperature tempB0 in a predetermined area of the RAM 34. Subsequently, the CPU 32 inputs an output signal value of the exhaust temperature sensor 30 after a predetermined time has elapsed since the desorbing process was started, and this output signal value is stored as a second temperature tempB1 in a predetermined area of the RAM 34. Then, the CPU 32 compares the first temperature tempB0 with the second temperature tempB1.

Herein, if the unburned gas components in the exhaust gas is adsorbed by the adsorbing material 22 in the so-called adsorbing process wherein the adsorbing material 22 is normal and the adsorbing material 22 adsorbs the unburned gas component, in the desorbing process thereafter, the unburned gas component adsorbed by the adsorbing material 22 is desorbed and burned in the exhaust purifying catalyst 15, and hence the temperature of the exhaust gas passing through the exhaust purifying catalyst 15 rises. On this occasion, the burning of the unburned gas component is activated within the exhaust purifying catalyst 15 by enhancing the oxygen concentration in the exhaust gas, whereby an increase rate of the exhaust gas temperature rises.

While on the other hand, the adsorbing material 22 is deteriorated or falls into a failure, and a quantity of the unburned gas component adsorbed by the adsorbing material 22 decreases, in which case a small quantity of unburned gas component adsorbed by the adsorbing material 22 is burned at an initial time in the desorbing process. Consequently, the temperature becomes substantially the same temperature as when in the normal state. When the desorption of the unburned gas component adsorbed by the adsorbing material 22 is finished as well as finishing the burning of the unburned gas component with the exhaust purifying catalyst 15, however, the temperature of the exhaust gas is absorbed by the adsorbing material 11 and by the exhaust purifying catalyst 15, and therefore the temperature of the exhaust gas passing through the exhaust purifying catalyst 15 drops down.

Accordingly, if a value of the second temperature tempB1 proves to be larger than the first temperature tempB0 as a result of making the comparison between the first temperature tempB0 and the second temperature tempB1, the adsorbing material 22 may be judged to be normal. Whereas if the second temperature tempB1 is under the first temperature tempB0, the adsorbing material 22 may be judged to be abnormal.

Incidentally, according to the judging method discussed above, if an output characteristic of the exhaust temperature sensor 30 changes due to a change with a passage of time of the exhaust temperature sensor 30 etc, and if there is a scatter in the output signal value of the exhaust temperature sensor 30 due to an initial tolerance of the parts constituting the exhaust temperature sensor 30, there might be a possibility in which the adsorbing material 22 is judged to be abnormal in spite of the adsorbing material 22 functioning normally. Further, if a measuring time of the second temperature is specified at one period of time, it might be considered that the temperature when measured becomes a peculiar value due to the change in the operating state of the internal combustion engine 1.

Figure 5:
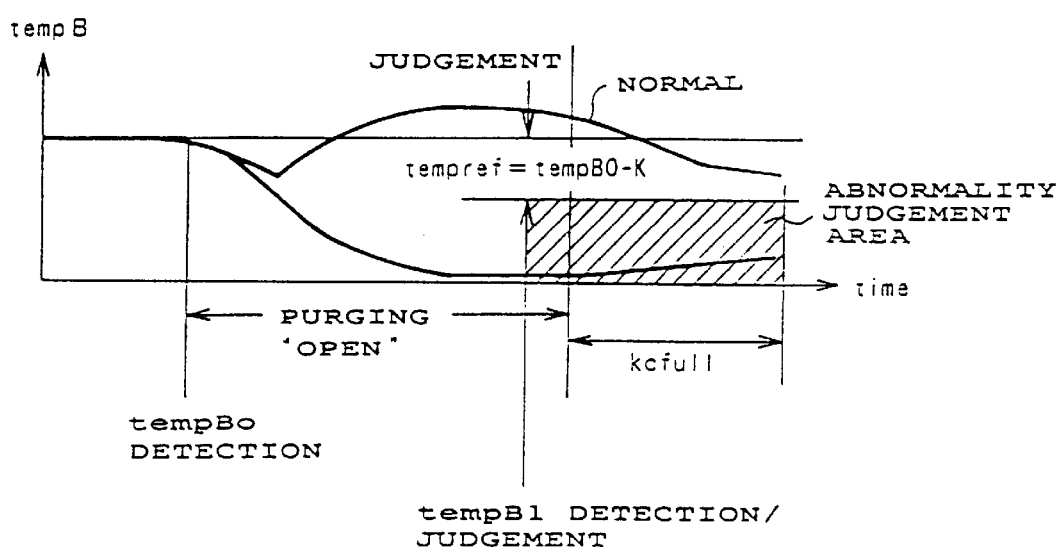
FIG. 5 is a diagram showing changes in temperature of an exhaust gas when an absorbing material is normal and when abnormal.

This being the case, in accordance with this embodiment, as shown in FIG. 5, a value obtained by subtracting a predetermined value K from the first temperature tempB0 is set as a judgement reference value tempref in order to set the judgement fiducial value allowing for the change with the passage of time and the initial tolerance, and, if there continues for a predetermined time such a state that the second temperature tempB1 is under the judgement reference value tempref, it is judged that the adsorbing material 22 is abnormal.

Moreover, the operating state such as enhancing the oxygen concentration in the exhaust gas may, it can be considered, include a deceleration fuel cut process executing state, a state in which the oxygen concentration in the mixed gas burned in the internal combustion engine 1 is high, or a state where the exhaust gas is mixed with the secondary air upstream of the exhaust purifying catalyst 15 when the internal combustion engine 1 is in the idling status.

Figure 6:
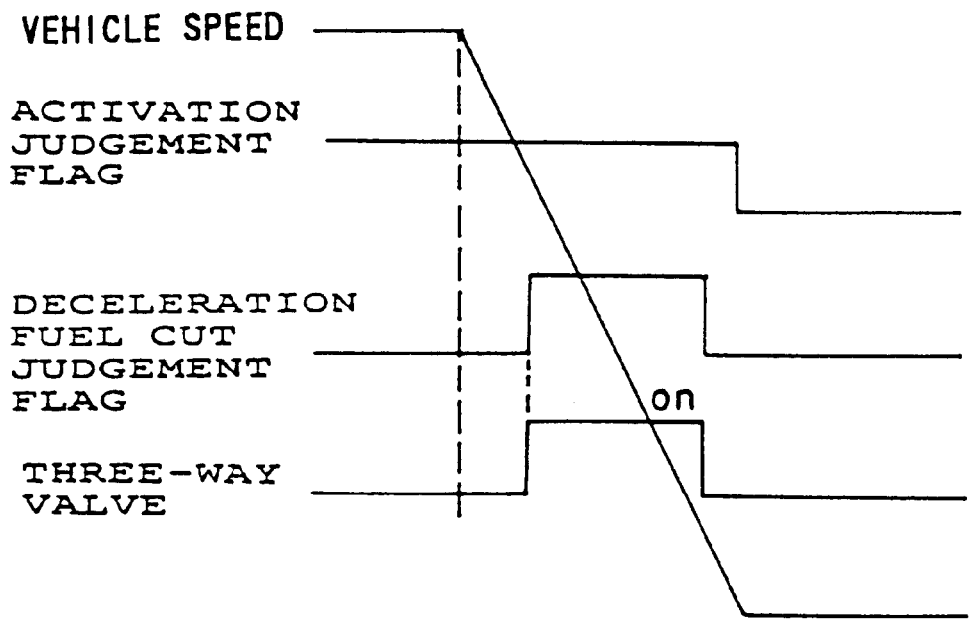
FIG. 6 is a timing chart (1) showing an execution timing of a failure judging process.

In this embodiment, when the internal combustion engine 1 comes to the deceleration fuel cut process executing state when in the desorbing process, for example, as shown in FIG. 6, the exhaust purifying catalyst 15 is activated (the activation judgement flag is in the ON-state), and a traveling speed of the vehicle mounted with the internal combustion engine 1 is brought into the decelerated state on such an occasion that the temperature of the adsorbing material 22 rises up to the predetermined temperature. Then, when the deceleration fuel cut process is executed (the deceleration fuel cut judgement flag is in the ON-state), the CPU 32 permits the conduction between the suction negative pressure passageway 27 and the negative pressure passageway 26 by driving the VSV 20, then starts the desorption from the adsorbing material 22, and executes the above-mentioned deterioration judging process.

Figure 7:
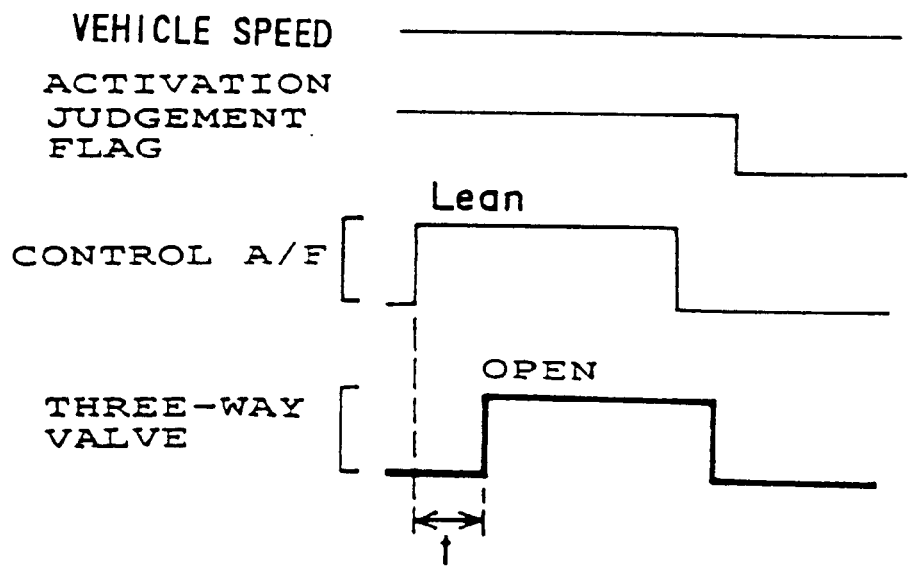
FIG. 7 is a timing chart (2) showing the execution timing of the failure judging process.

Further, if the internal combustion engine 1 does not come to the deceleration fuel cut process executing state when in the desorbing process, for instance, as shown in FIG. 7, the purifying catalyst 15 is activated, and the temperature of the adsorbing material 22 rises up to the predetermined temperature. On this occasion, the traveling speed of the vehicle becomes substantially a constant state, and, if the deceleration fuel cut process is not executed (if the deceleration fuel cut judgement flag is in the OFF-state), the CPU 32 makes a correction by decreasing the fuel injection quantity (the fuel injection quantity is corrected in order to set the mixed gas air fuel ratio A/F into a lean state) in order to enhance the oxygen concentration in the mixed gas burned in the internal combustion engine 1. Then, the CPU 32, after a predetermined time t has elapsed since the control has been started in order to set the mixed gas air fuel ratio into the lean state, permits the conduction between the suction negative pressure passageway 27 and the negative pressure passageway 26 by driving the VSV 20, then starts the desorption from the adsorbing material 22, and executes the deterioration judging process described above.

Herein, the predetermined time t is a time required till the mixed gas set into the lean state is burned in the internal combustion engine 1 and flows to the adsorbing material 22. This predetermined time t changes corresponding to the parameters such as the suction air quantity and the number of rotations of the internal combustion engine 1, and hence the ROM 33 may be stored with the map for showing a relationship between the parameters described above and the predetermined time t.

As described above, the CPU 32 and the application program and the control map of the ROM 33 actualize a failure judging device according to the present invention.

An operation and effects in this embodiment will hereinafter be explained.

Figure 8:
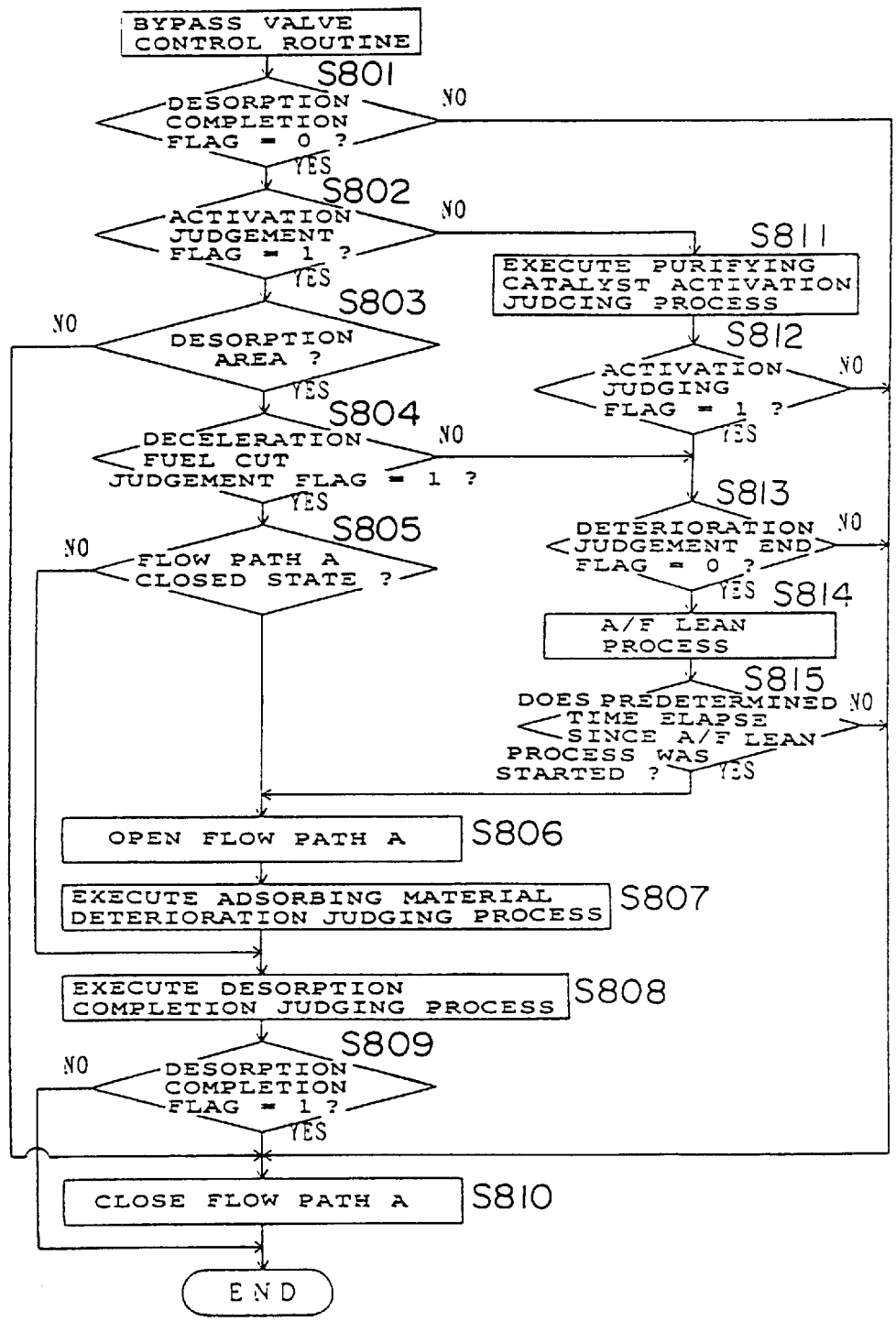
FIG. 8 is a flowchart showing a bypass valve control routine.

The CPU 32, after finishing the adsorbing process of the unburned gas component, executes a bypass valve control routine as shown in FIG. 8. In this bypass valve control routine, the CPU 32, to start with, judges in S801 whether the desorption completion flag is "0" or not by accessing the desorption completion flag storage area of the RAM 34.

When judging in S801 that the desorption completion flag is "1", the CPU 32 diverts the processing to S810, wherein the CPU 32 applies to the VSV 20 the driving pulse corresponding to the duty ratio 0%, then closes the flow path A within the adsorption cylinder 14 and makes conductive the flow path B.

While on the other hand, when judging in S801 that the desorption completion flag is "0", the CPU 32, advancing to S802, has an access to the activation judgement flag storage area of the RAM 33, and judges whether or not the activation judgement flag is "1".

In the case of judging in S802 that the activation judgement flag is "1", the CPU 32 advances to S803, in which the CPU 32 compares the integrated value of the quantity of air sucked by the internal combustion engine 1 up to the present time since the internal combustion engine 1 has been started, with the first judgement integrating suction air quantity stored in the RAM 34, and judges whether or not the temperatures state of the adsorbing material 22 is encompassed within the desorption area.

When judging in S803 that the temperatures state of the adsorbing material 22 is in the desorption area, the CPU 32 advances to S804, wherein the CPU 32 accesses the deceleration fuel cut judgement flag storage area of the RM 34 and judges whether or not the deceleration fuel cut judgement flag is "1".

When judging in S804 that the deceleration fuel cut judgement flag is "1", the CPU 32 advances to S805, in which the CPU 32 judges whether or not the flow path A within the adsorption cylinder 14 is in the closed state, i.e., whether the desorbing process is started or not yet.

The CPU 32, when judging in S805 that the flow path A in the adsorption cylinder 14 is in the closed state, advances to S806, wherein the CPU 32 applies to the VSV 20 the driving pulse corresponding to the duty ratio 100%, then makes conductive the flow path A and closes the flow path B in order to execute the desorbing process from the adsorbing material 22.

Figure 9:
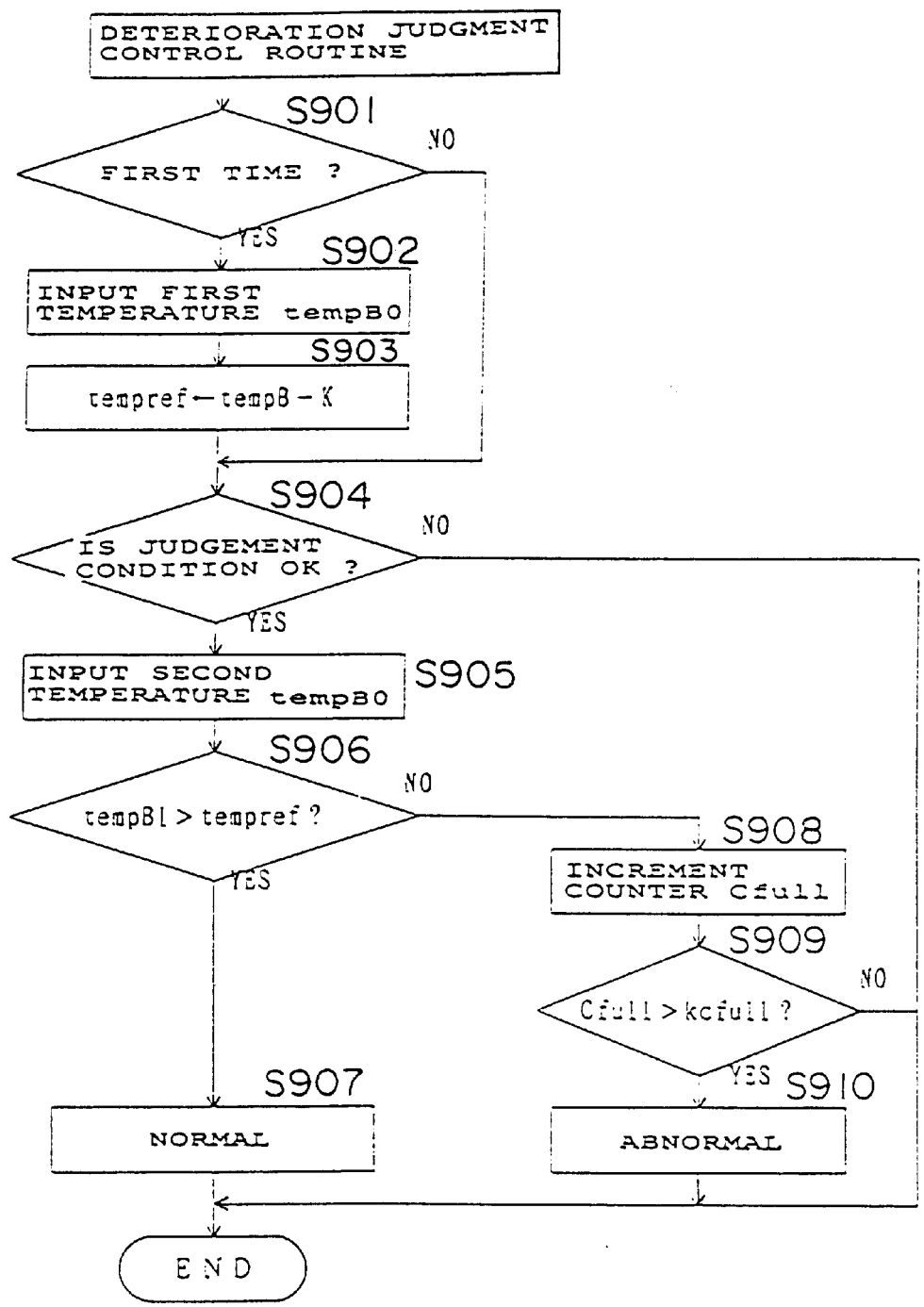
FIG. 9 is a flowchart showing a deterioration judgement control routine for the adsorbing material.

Subsequently, the CPU 32, upon proceeding to S807, executes the deterioration judging process about the adsorbing material 22. On this occasion, the CPU 32 executes the deterioration judgement control routine as shown in FIG. 9. This deterioration judgement control routine is repeatedly executed at an interval of a predetermined time. Then, in the deterioration judgement control routine, the CPU 32 judges in S901 whether or not the deterioration judgement control routine is executed for the first time, i.e., judges whether or not the number of executions of the deterioration judgement control routine is "1".

The CPU 32, when judging in S901 that the number of executions of the deterioration judgement control routine is "1", proceeds to S902, wherein the CPU 32 inputs the output signal value of the exhaust temperature sensor 30 at that point of time as the first temperature tempB0.

Subsequently, the CPU 32 advances to S903, in which the CPU 32 calculates the judgement reference value tempref (=tempB0–K) by subtracting the predetermined value K from the first temperature tempB0 inputted in S902. Then, the CPU 32 stores a predetermined area of the RAM 34 with the judgement reference value tempref.

Next, the CPU 32 proceeds to S904 and judges herein whether conditions of the deterioration judgement are met or not. Herein, the deterioration judgement conditions may be, e.g., a condition (1) that a predetermined time elapses since the first temperature tempB0 has been inputted (the predetermined elapses since the start of the desorbing process), and a condition (2) that the internal combustion engine 1 is in such an operating state as to enhance the oxygen concentration in the exhaust gas. Then, the CPU 32, when judging that the conditions (1) and (2) are met, proceeds to S905. Whereas if the CPU 32 judges that the conditions (1) and (2) are not satisfied, the CPU 32 temporarily finishes the deterioration judgement control routine, and re-executes the processes from S904 onwards after the predetermined time has passed. On this occasion, if it is judged that the conditions (1) and (2) are met, the CPU 32 advances to S905.

In S905, the CPU 32 inputs the output signal value of the exhaust temperature sensor 30 at that point of time as the second temperature tempB1. Subsequently, the CPU 32 compares in S906 the second temperature tempB1 inputted in S905 with the judgement reference value tempref stored in the RAM 34 in S903, and judges whether or not the second temperature tempB1 is larger than the judgement reference value tempref.

The CPU 32, when judging in S906 that the second temperature temB1 is under the judgement reference value tempref, advances to S908 and increments a value of a counter Cfull for counting a duration time for which the second temperature tempB1 continues to be under the judgement reference value tempref.

Then, the CPU 32 proceeds to S909 and judges herein whether or not the value, incremented in S908, of the counter Cfull is larger than a predetermined value kcfull, i.e., whether or not the state of the second temperature tempB1 being under the judgement reference value tempref lasts longer than the predetermined time kcfull.

When judging in S909 that the value of the counter Cfull is larger than the predetermined value kcfull (when judging that the state of the second temperature tempB1 being under the judgement reference value tempref lasts longer than the predetermined time kcfull), the CPU 32 comes to such a judgement that the adsorbing material 22 is abnormal.

While on the other hand, when judging in S909 that the value of the counter Cfull is under the predetermined value kcfull (when judging that the state of the second temperature tempB1 being under the judgement reference value tempref does not last longer than the predetermined time kcfull), the CPU 32 temporarily finishes this routine and again executes the same routing after the predetermined time has elapsed. On this occasion, if the second temperature tempB1 is judged in S906 to be larger than the judgement reference value tempref, the CPU 32 judges that the adsorbing material 22 is normal, and finishes this deterioration judgement control routine. Further, if the second temperature tempB1 is judged in S906 to be under the judgement reference value tempref, the CPU 32 increments in S908 the value of the counter Cfull, and proceeds to S909.

When the deterioration judging process about the adsorbing material 22 is thus ended, the CPU 32 writes "1" to the deterioration judgement end flag storage area of the RAM 34, and returns to the bypass valve control routine shown in FIG. 8. Then, in the bypass valve control routine, the CPU 32 executes the process in S808.

In S808, the CPU 32 judges whether a temperature state of the adsorbing material 22 is encompassed within a desorption end area by comparing the integrated value of the quantity of air sucked by the internal combustion engine 1 up to the present time since the internal combustion engine 1 has been started with the first judgement integrating suction air quantity, i.e., executes a so-called desorption completion process.

When judging in S808 that the temperature state of the adsorbing material 22 is in the desorption end area, the CPU 32 writes "1" to the desorption completion flag storage area of the RAM 34 and, when judging that the temperature state of the adsorbing material 22 is not in the desorption end area, writes "0" to the desorption completion flag storage area of the RAM 34.

Subsequently, the CPU 32 advances to S809, wherein the CPU 32 accesses the desorption completion flag storage area of the RAM 34, and judges whether the desorption completion flag is "1" or nor. The CPU 32, when judging that the desorption completion flag is "1", proceeds to S810, wherein the CPU 32 applies to the VSV 20 the driving pulse corresponding to the duty ratio 0%, then closes the flow path A within the adsorption cylinder 14 and makes conductive the flow path B.

While on the other hand, when judging in S809 that the desorption completion flag is "0", the CPU 32 temporarily finishes the bypass valve control routine and re-executes this routine after a predetermined has passed. In this case, it follows that the CPU 32 judges in S805 that the flow path A is brought into the closed state, and hence, upon moving forward to S808, re-executes the desorption judging process.

Then, if the temperature state of the adsorbing material 22 is judged in S808 to be in the desorption rend area, the CPU 32 writes "0" to the desorption completion flag storage area of the RAM 34. The CPU 32 judges in S809 that the desorption completion flag is "1", and advances to S810.

Further, when judging in S802 that the activation judgement flag is not "1", the CPU 32, upon advancing to S811, executes a purifying catalyst activation judging process. In this case, the CPU 32 judges whether or not an elapse time up to the present time since the internal combustion engine has started reaches a catalyst activation time calculated based on the output signal of the water temperature sensor 18 when starting the internal combustion engine. Then, the CPU 32, when judging that the elapse time up to the present time since the internal combustion engine has started reaches the catalyst activation time, rewrites the value in the activation judgement flag storage area of the RAM 34 from "0" to "1".

Subsequently, the CPU 32 proceeds to S812 and judges herein whether or not the value in the activation judgement flag storage area of the RM 34 has been rewritten to "1". The CPU 32, when judging in S812 that the value in the activation judgement flag storage area of the RM 34 has not been rewritten to "1", moves forward to S810, wherein the CPU 32 successively applies the driving pulse corresponding to the duty ratio 0% to the VSV 20, and makes the flow path A kept in the closed state.

By contrast, the CPU 32, when judging in S812 that the value in the activation judgement flag storage area of the RM 34 has been rewritten to "1", advances to S813, wherein the CPU 32 judges whether or not "1" is stored in the deterioration judgement end flag storage area of the RAM 34, i.e., whether or not the deterioration judging process about the adsorbing material 22 has already been executed.

The CPU, when judging in S813 that "1" is not stored in the deterioration judgement end flag storage area of the RAM 34, advances to S810, in which the CPU 32 applies to the VSV 20 the driving pulse corresponding to the duty ratio 0% and closes the flow path A.

While on the other hand, the CPU, when judging in S813 that "1" is stored in the deterioration judgement end flag storage area of the RAM 34, advances to S814, in which the CPU 32 executes an A/F lean process in order to set, in a lean atmosphere, an air fuel ratio of the mixed gas burned in the internal combustion engine 1. On this occasion, the CPU 32 makes a correction by reducing the fuel injection quantity calculated in the fuel injection quantity control routine. Further, the CPU 32 inputs in S814 the number of rotations of the engine and the suction air quantity and the number at that point of time, and calculates, from the maps of the ROM 33, a predetermined time t (required till the mixed gas set in the lean state is burned in the internal combustion engine 1 and flows to the adsorbing material 22) corresponding to the suction air quantity and the number of rotations of the engine.

Subsequently, the CPU 32 proceeds to S815 and judges herein whether or not the predetermined time t elapses since the starting time of execution of the lean process. The CPU 32, when judging in S815 that the predetermined time t does not elapse since the starting time of execution of the lean process, advances to S810, wherein the CPU 32 successively applies to the VSV 20 the driving pulse corresponding to the duty ratio 0% and makes the flow path A kept in the closed state.

On the other hand, the CPU 32, when judging in S815 that the predetermined time t elapses since the starting time of execution of the lean process, executes the processes from S806 onwards.

As discussed above, in accordance with this embodiment, if the deceleration fuel cut process is executed when desorbing the unburned gas component adsorbed to the adsorbing material 22, the deterioration judging process about the adsorbing material 22 is carried out synchronizing with the deceleration fuel cut process. Whereas if the deceleration fuel cut process is not executed, the deterioration judging process about the adsorbing material 22 is implemented by controlling the fuel injection quantity in order to set the air fuel ratio of the mixed gas in the lean atmosphere, and hence there is enhanced the oxygen concentration in the exhaust gas flowing to the adsorbing material 22 when in the deterioration judging process.

Then, if the adsorbing material 22 is normal and adsorbs a predetermined quantity of unburned gas component when in the adsorbing process, the unburned gas component desorbed from the adsorbing material 22 flows together with the exhaust gas in the oxygen excessive atmosphere to the exhaust purifying catalyst 15 in the desorbing process thereafter.

In this case, the unburned gas component is exposed to an enormous amount of oxygen, and consequently the burning of the unburned gas component is activated in the exhaust purifying catalyst 15. Then, a burning temperature thereof is higher than in the case where the oxygen concentration in the exhaust gas is not high. As a result, if the adsorbing material 22 is normal, there appears a distinct change in temperature in the exhaust purifying catalyst 15 between at the initial stage of the desorption process and after the elapse of the predetermined time since the start of the desorbing process.

While on the other hand, if the adsorbing material 22 is deteriorated or falls into a failure and is unable to adsorb the predetermined quantity of unburned gas component when in the adsorbing process, there decreases the quantity of the unburned gas component desorbed from the adsorbing material 22 in the desorbing process thereafter.

In this case, the unburned gas component to be burned is reduced in the exhaust purifying catalyst 15, and hence there does not appear the change in temperature due to the burning of the unburned gas component in the exhaust purifying catalyst 15.

Hence, in accordance with this embodiment, when the exhaust gas flowing to the adsorbing material 22 is in the oxygen excessive state, i.e., when there is met the condition under which a deviation between a temperature change characteristic at the normal time of the adsorbing material 22 and a temperature change characteristic at the abnormal time of the adsorbing material 22 distinctly appears, the deterioration judging process about the adsorbing material 22 is executed, and it is therefore feasible to make the precise judgement about the deterioration even in the case of using a temperature sensor not exhibiting a high accuracy.

Another Embodiments

Next, another embodiments of the failure diagnosing device for the exhaust purifying apparatus according to the present invention will be discussed with reference to the drawings. Herein, a construction different from that in the embodiment discussed above will be explained, and the explanation of the same construction is omitted.

Figure 10:
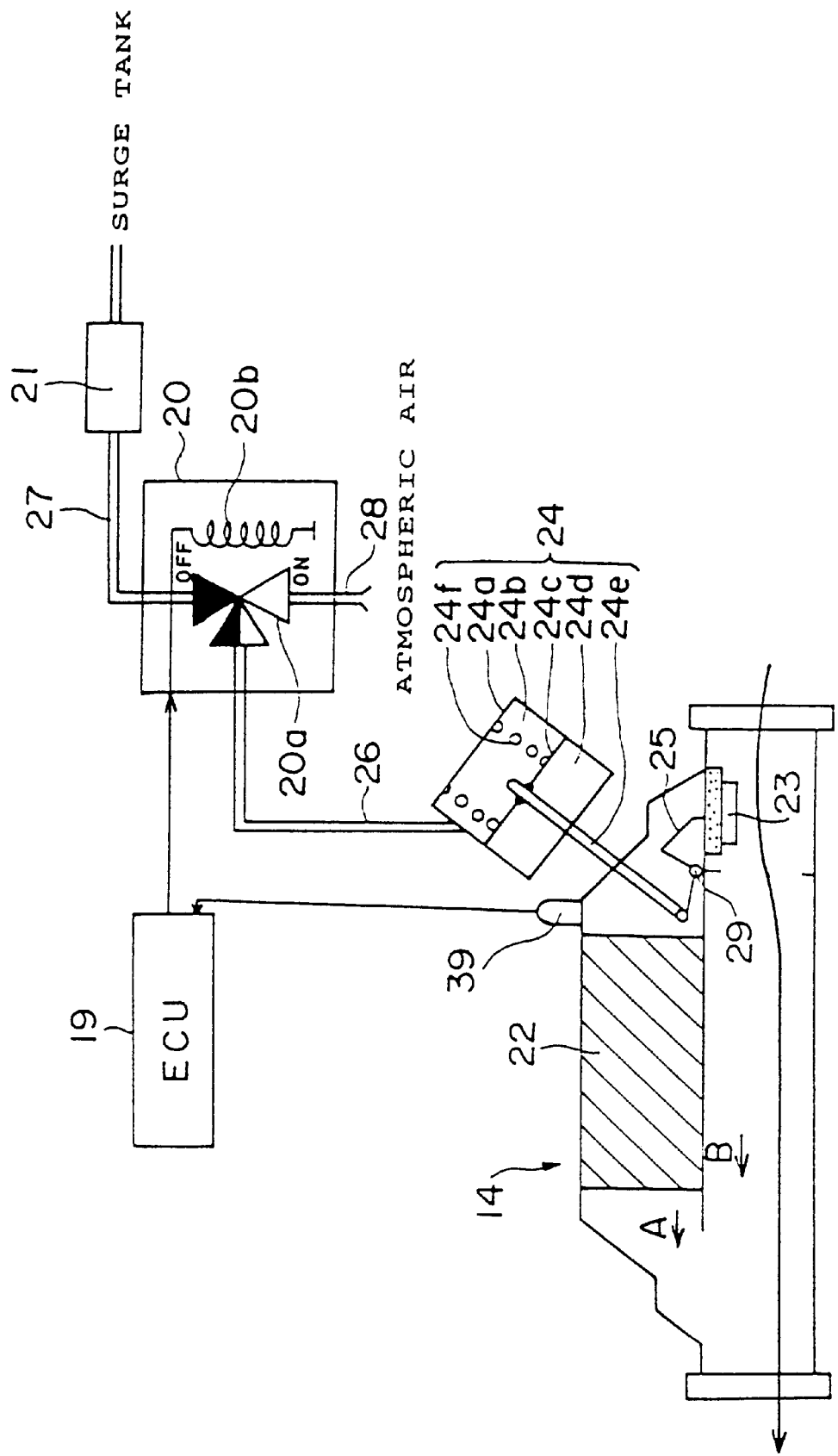
FIG. 10 is a sectional view illustrating a construction of the adsorption cylinder 14 in another embodiment.

FIG. 10 shows a configuration of the adsorption cylinder 14 in accordance with this embodiment. Th flow path A of the adsorption cylinder 14 is fitted with an exhaust temperature sensor 39 (hereinafter, the exhaust temperature sensor 30 is called a first exhaust temperature sensor 30, while the exhaust temperature sensor 39 is referred to as a second exhaust temperature sensor 39) for outputting an electric signal corresponding to a temperature of the exhaust gas flowing at an inlet of the adsorbing material 22.

Then, the CPU 32 of the ECU 19, when the oxygen concentration in the exhaust gas flowing to the adsorbing material 22 in the desorbing process is high, makes a deterioration judgement about the adsorbing material 22 on the basis of an exhaust gas temperature (a temperature of the exhaust gas just before flowing to the adsorbing material 22: an output signal value of the second exhaust temperature sensor 39) on an upstream side of the adsorbing material 22, and a temperature (a temperature of the exhaust gas passing through the adsorbing material 22 and the exhaust purifying catalyst 15) of the exhaust gas immediately after flowing from the exhaust purifying catalyst 15.

Namely, as stated in the embodiment discussed above, when the adsorbing material 22 adsorbs the predetermined quantity of unburned gas component in the adsorbing process, and if the oxygen concentration in the exhaust gas increases in the desorbing process thereafter, the unburned gas component desorbed from the adsorbing material 22 is exposed to the large quantity of oxygen. Therefore, the burning of the unburned gas component in the adsorbing material 22 and in the exhaust purifying catalyst 15 is activated.

In this case, the exhaust gas flowing from the exhaust purifying catalyst 15 rises in temperature because of receiving the burning heat of the unburned gas component when flowing within the adsorbing material 22 and the exhaust purifying catalyst 15, and therefore becomes an exhaust gas exhibiting a higher temperature than before passing through the adsorbing material 22.

Whereas if the predetermined quantity of unburned gas component is not adsorbed to the adsorbing material 22 during the adsorbing process, the unburned gas component desorbing from the adsorbing material 22 is small in quantity even by enhancing the oxygen concentration in the exhaust gas during the desorbing process thereafter, and it therefore follows that the unburned gas component is burned at the initial stage of the desorbing process.

In this case, the heat of the exhaust gas flowing out of the exhaust purifying catalyst 15 is, when flowing within the adsorbing material 22 and the exhaust purifying catalyst 15, absorbed by the adsorbing material 22 and the exhaust purifying catalyst 15 as well, and consequently the temperature of the above exhaust gas becomes lower than before passing through the adsorbing material 22.

Figure 11:
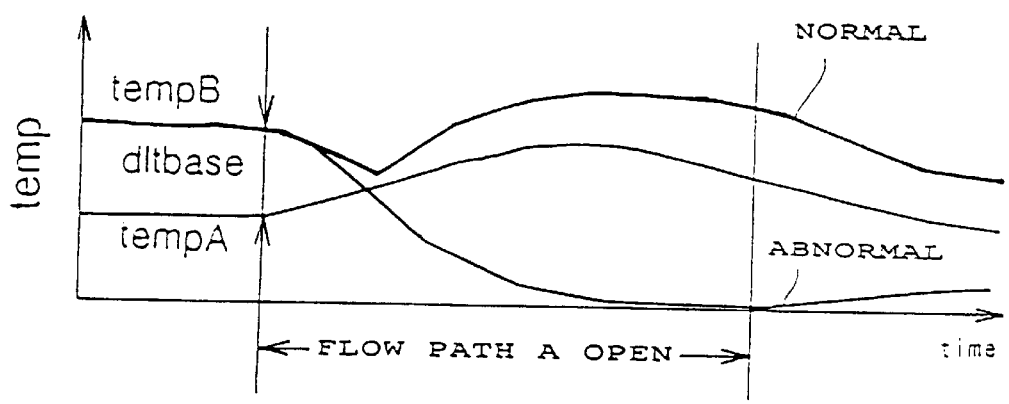
FIG. 11 is a diagram showing temperature changes in exhaust gas temperatures tempA and tempB when the adsorbing material is normal and when abnormal.

Accordingly, as shown in FIG. 11, if the adsorbing material 22 is normal, an exhaust gas temperature tempB detected by the first exhaust temperature sensor 30 is larger than an exhaust gas temperature tempA detected by the second exhaust temperature sensor 39. If the adsorbing material 22 is deteriorated or falls into a failure, the exhaust gas temperature tempB detected by the first exhaust temperature sensor 30 is smaller than the exhaust gas temperature tempA detected by the second exhaust temperature sensor 39.

Thus, the deterioration judgement about the adsorbing material 22 can be made by comparing the is exhaust gas temperature tempB at the inlet of the adsorbing material 22 with the exhaust gas temperature tempA at an outlet of the exhaust purifying catalyst 15.

Incidentally, it can be considered that a deviation of a temperature difference between the exhaust gas temperatures tempA and tempB if the adsorbing material 22 is normal from a temperature difference between the exhaust gas temperatures tempA and tempB if the adsorbing material 22 is abnormal might be a small value due to a temporary temperature change caused by an influence such as a disturbance etc. In this case, the temperature sensor with a low detection accuracy is incapable of detecting the above deviation, which might bring about a misjudgement. Further, a temperature difference exists between the exhaust gas temperatures tempB and tempA before executing the desorbing process, and it is therefore required that this temperature be taken into consideration.

Such being the case, in accordance with this embodiment, there is calculated a difference dltbase (=tempB−tempA) between the exhaust gas temperatures tempA and tempB just before the desorbing process. Then, in the desorbing process, the temperatures tempA, tempB are detected at an interval of a predetermined time during a period for which the oxygen concentration in the exhaust gas remains high, an exhaust temperature difference dltemp (=tempB−tempA+dltbase) by adding the difference dltbase to a value obtained by subtracting tempA from tempb, and an integrated value dltempsum (=Σdltemp) of the exhaust temperature difference dltemp is thus calculated.

Figure 12:
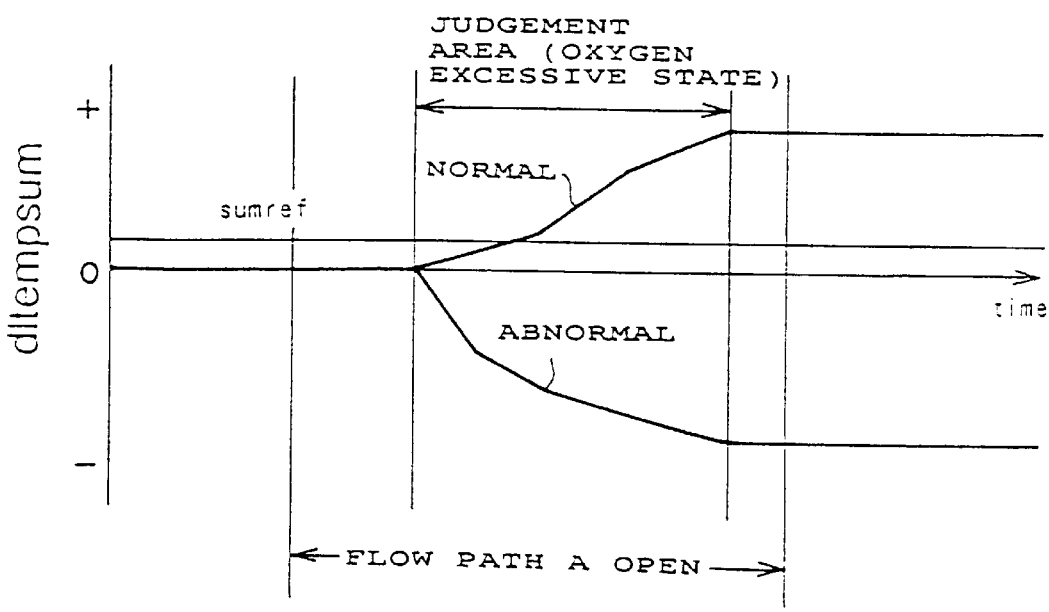
FIG. 12 is a diagram showing changes in an integrated value dltempsum when the adsorbing material is normal and when abnormal.

A value of the thus calculated integrated value dltempsum is, as shown in FIG. 12, largely different depending on the case where the adsorbing material 22 is normal and the case where the adsorbing material 22 is deteriorated or falls into the failure, and a deviation of the integrated value dltempsum at the normal time from the integrated value deltempsum at the abnormal time becomes distinct. It is therefore feasible to precisely detect the deviation between at the normal time and at the abnormal time even when using the temperature sensor having the low accuracy.

Then, the CPU 32, if the integrated value dltempsum is under a predetermined value sumref, judges that the adsorbing material 22 is deteriorated or falls into the failure and, if the integrated value dltempsum is larger than the predetermined value sumref, judges that the adsorbing material 22 is normal.

Note that the predetermined value sumref is defined as a judgement reference value sumref set to restrain a scatter in the output characteristics due to the initial tolerance with respect to the parts constituting the first and second exhaust temperature sensors 30, 39.

An operation and effects of this embodiment will hereinafter be explained.

Figure 13:
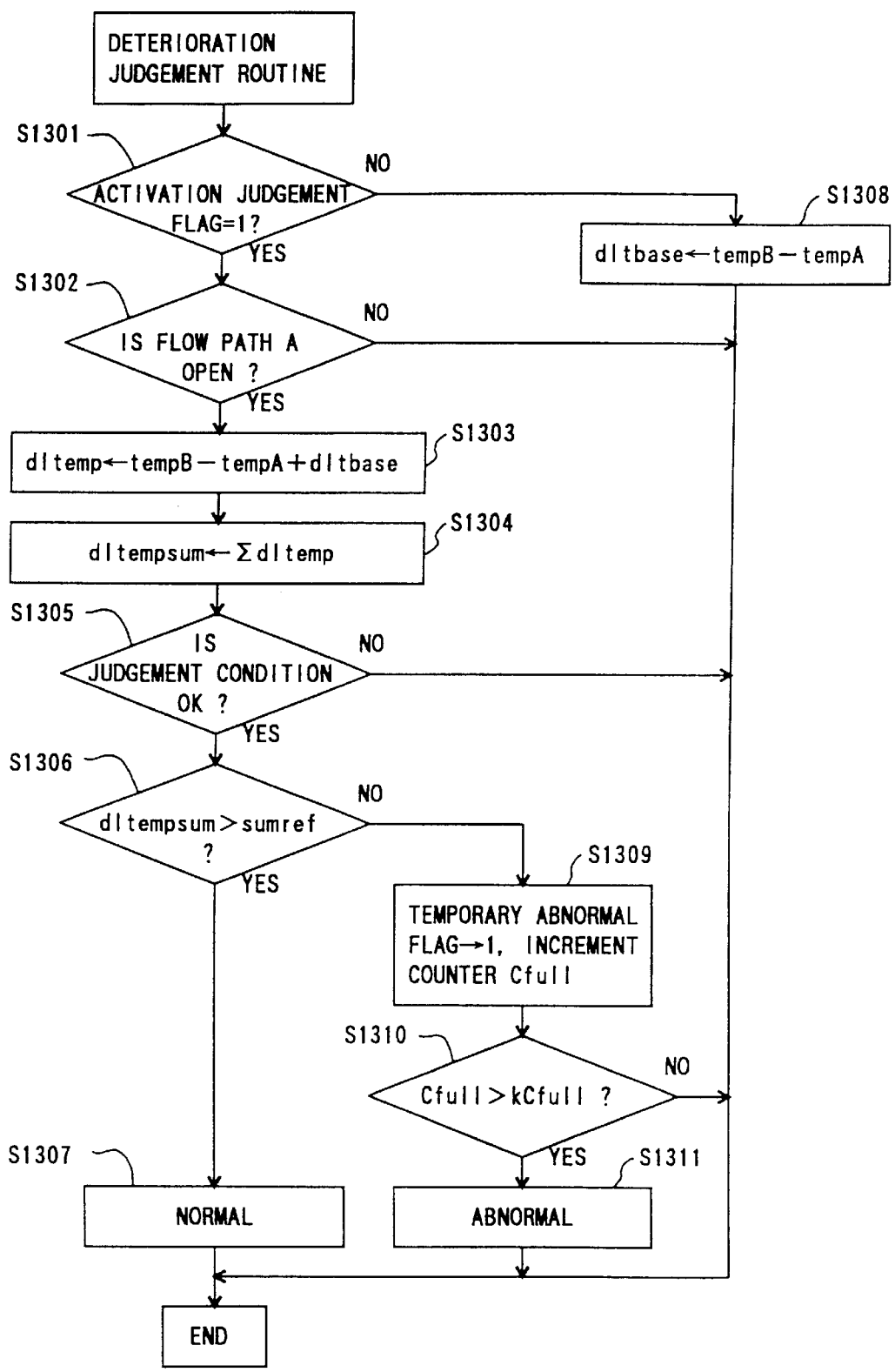
FIG. 13 is a flowchart showing a deterioration judgement control routine for the adsorbing material in another embodiment.

The CPU 32 executes a deterioration judgement control routine as shown in FIG. 13 on the occasion of making the deterioration judgement about the adsorbing material 22. The deterioration judgement control routine is repeatedly executed at an interval of a predetermined time.

In the deterioration judgement control routine, in S1301, the CPU 32 has an access to the activation judgement flag storage area of the Ram 34 and judges whether or not a value of the activation judgement flag is "1".

The CPU 32, when judging in S1301 that the value of the activation judgement flag is "0", diverts the processing to S1308, wherein the CPU 32 inputs the output signal values (tempA, tempB) of the first and second exhaust temperature sensors 30, 39 at that point of time, and calculates a difference dltbase by subtracting the output signal value tempA from the output signal value tempB. Then, the CPU 32 stores a predetermined area of the RAM 34 with the difference dltbase, and temporarily finishes this deterioration judgement routine.

While on the other hand, the CPU 32, when judging in S1301 that the value of the activation judgement flag is "1", proceeds to S1302 and judges herein whether or not the flow path A within the adsorption cylinder 14 is conductive.

The CPU 32, when judging in S1302 that the flow path A within the adsorption cylinder 14 is closed, temporarily finishes the deterioration judgement control routine and re-executes the processes from S1301 onwards after a predetermined time has elapsed.

Further, the CPU 32, when judging in S1302 that the flow path A within the adsorption cylinder 14 is conductive, advances to S1303, wherein the CPU 32 inputs the output signal values tempA and tempB of the first and second exhaust temperature sensors 30, 39 at that point of time, and calculates a value deltemp obtained by adding the difference dltbase stored in the RAM 34 in S1308 to a difference (tempB−tempA) between the output signal values tempA and tempB.

Subsequently, the CPU 32 moves forward to S1304, in which the CPU 32 calculates a new integrated value dltempsum (=Σdltemp) by adding dltemp calculated in S1304 to the integrated value dltempsum calculated when executing this routine last time. Then, the CPU 32 stores a predetermined area of the RAM 34 with the integrated value dltempsum.

Next, the CPU 32 advances to S1305 and judges herein whether or not the conditions for the deterioration judgement are met. Herein, the deterioration judgement conditions may be, e.g., a condition (1) that a predetermined time elapses since the desorbing process about the adsorbing material has been started, and a condition (2) that the internal combustion engine 1 is in such an operating state as to enhance the oxygen concentration in the exhaust gas. Then, the CPU 32, when judging that the conditions (1) and (2) are met, proceeds to 51306. Whereas if the CPU 32 judges that the conditions (1) and (2) are not satisfied, the CPU 32 temporarily finishes this routine, and re-executes the processes from S1301 onwards after the predetermined time has passed. On this occasion, if it is judged that the conditions (1) and (2) are met, the CPU 32 advances to S1306.

In S1306, the CPU 32 reads the integrated value dltempsum stored in the RAM 34 in S1304, and also reads the judgement reference value sumref previously stored in ROM 33. Then, the CPU 32 judges whether or not the integrated value dltempsum is larger than the judgement reference value sumref.

The CPU 32, when judging in S1306 that the integrated value dltempsum is larger than the judgement reference value sumref, proceeds to S1307 and judges herein that the adsorbing material 22 is normal, thus finishing this routine.

Contrastingly, the CPU 32 judges in S1306 that the integrated value dltempsum is under the judgement reference value sumref, proceeds to S1309, wherein the CPU 32 writes "1" to a tentative abnormality flag storage area set in the RAM 34, and increments a value of the counter Cfull for counting a duration time of a state where the integrated value dltempsum remains under the judgement reference value sumref.

Then, the CPU 32 proceeds to S1310, wherein the CPU 32 judges whether or not the counter Cfull value incremented in S1309 is larger than the predetermined value kcfull.

The CPU 32, when judging in S1310 that the value of the counter Cfull is larger than the predetermined value kcfull, advances to S1311 and judges herein that the adsorbing material 22 is abnormal, thus finishing the deterioration judgement control routine.

While on the other hand, the CPU 32 judges in S1310 that the counter Cfull value incremented in S1309 is under the predetermined value kcfull, temporarily makes the deterioration judgement control routine come to an end, and re-executes this routine after the predetermined has elapsed. On this ccasion, if the integrated value dltempsum becomes a value larger than the judgement reference value sumref in S1306, the CPU 32 proceeds to S1307, in which the CPU 32 judges that the adsorbing material 22 is normal and finishes this routine. Further, if the integrated value dltempsum is judged in S1306 to be under the judgement reference value sumref, the CPU 32 moves forward to S1309 and increments the value of the counter Cfull. Then, the CPU 32 advances to S1310.

According to the embodiment discussed above, the same effect as the one in the preceding embodiment is obtained even when using the exhaust gas temperature tempA just before flowing to the adsorbing material 22 and the exhaust gas temperature tempB immediately after flowing out of the exhaust purifying catalyst 15 disposed in series to the adsorbing material 22.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An exhaust purifying apparatus in an internal combustion engine comprising:

adsorbing means, provided in an exhaust passageway in the internal combustion engine, for adsorbing an unburned gas component in an exhaust gas;

a purifying catalyst disposed on the downstream side of said adsorbing means;

first temperature detecting means for detecting an exhaust temperature at the downstream side of said purifying catalyst;

second temperature detecting means for detecting the exhaust temperature at the upstream side of said adsorbing means; and failure judging means for judging failure of said adsorbing means based on a difference between a detected temperature of said first temperature detecting means and a detected temperature of said second temperature detecting means on the condition that the exhaust gas is in an oxygen excessive state when it passes through said adsorbing means and when the unburned gas component adsorbed in said adsorbing means is desorbed therefrom.

* * * * *